(12) United States Patent
Qiu

(10) Patent No.: US 12,133,588 B1
(45) Date of Patent: Nov. 5, 2024

(54) SILICONE SHOULDER PAD THAT PROTECTS NECK SCRATCHES AND PREVENTS SLIPPING AND REDUCES PRESSURE ON SHOULDERS

(71) Applicant: Bicheng Qiu, Meizhou (CN)

(72) Inventor: Bicheng Qiu, Meizhou (CN)

(*) Notice: Subject to any disclaimer, the term of this patent is extended or adjusted under 35 U.S.C. 154(b) by 0 days.

(21) Appl. No.: 18/680,000

(22) Filed: May 31, 2024

(51) Int. Cl.
*A45F 3/12* (2006.01)
*B60R 22/12* (2006.01)

(52) U.S. Cl.
CPC ............... *A45F 3/12* (2013.01); *B60R 22/12* (2013.01)

(58) Field of Classification Search
CPC ........................................................ A45F 3/12
See application file for complete search history.

(56) References Cited

U.S. PATENT DOCUMENTS

| | | | | |
|---|---|---|---|---|
| 5,292,044 A * | 3/1994 | Reimers | ..................... | A45F 3/12 224/264 |
| 5,445,858 A * | 8/1995 | Nwoko | ................... | F16F 9/006 428/318.6 |
| 6,219,867 B1 * | 4/2001 | Yates | ................. | A47B 21/0371 5/652 |
| 7,086,926 B2 * | 8/2006 | Falla | ..................... | A41F 15/007 450/86 |
| 8,133,264 B1 * | 3/2012 | LaFontaine | ............. | A61F 7/007 2/125 |
| 9,827,711 B2 * | 11/2017 | Wetsch | ................... | A47C 31/11 |
| 10,292,439 B2 * | 5/2019 | Martel | ............... | A41D 13/0568 |
| 11,612,232 B1 * | 3/2023 | Ward | ......................... | A45F 3/12 224/643 |
| 2004/0185247 A1 * | 9/2004 | Fenton | .................... | B32B 5/245 428/327 |
| 2009/0194568 A1 * | 8/2009 | Fraser | ....................... | A45F 3/12 224/264 |
| 2010/0155446 A1 * | 6/2010 | Stein | .................... | A47D 13/025 224/159 |
| 2017/0238683 A1 * | 8/2017 | Tian | ......................... | A45F 3/12 |
| 2022/0232953 A1 * | 7/2022 | Errafi | ..................... | A45C 13/30 |
| 2022/0232955 A1 * | 7/2022 | Burgess | ............... | A63B 55/408 |

* cited by examiner

*Primary Examiner* — Brian D Nash
(74) *Attorney, Agent, or Firm* — Birchwood IP

(57) ABSTRACT

A silicone shoulder pad that can protect neck scratches, prevent slipping and reduce pressure on shoulders is provided, which includes a shoulder pad body, the shoulder pad body includes an upper pad portion and a lower pad portion that are correspondingly provided and connected, an installation channel is formed between the upper pad portion and the lower pad portion, the upper pad portion is provided with a wire groove connected to the installation channel. The upper pad portion forms a first shoulder protection edge and a second shoulder protection edge through the wire groove; an outer surface of the lower pad portion is fixedly provided with a protruding structure, and a pressure reduction groove is provided in the installation channel. Through the above arrangement, the silicone shoulder pad can be detachably connected to a shoulder strap, has anti-slip and pressure reducing effects.

7 Claims, 5 Drawing Sheets

SILICONE SHOULDER PAD THAT PROTECTS NECK SCRATCHES AND PREVENTS SLIPPING AND REDUCES PRESSURE ON SHOULDERS

TECHNICAL FIELD

The present disclosure relates to the field of silicone shoulder pads technologies, and in particular, to a silicone shoulder pad that can protect neck scratches, prevent slipping and reduce pressure on shoulders.

BACKGROUND

With the popularization of various back/shoulder straps and car seat belts, more and more shoulder/back straps and seat belts suitable for various products have become one of the essential daily necessities for people. Although shoulder/back straps/seat belts can help people's lives to a certain extent, due to the production process of woven straps, the surface is smooth and easy to slip when worn, and a serrated side is prone to scratching skin when worn. The material is hard and cannot effectively reduce pressure when carrying the products. There are two types of shoulder/back straps and seat belts: one is a shoulder pad made of PVC material, but this shoulder pad can only be fixed on the strap and cannot be replaced, and at the same time, PVC is a non-degradable material that is not environmentally friendly; the material is hard, non-depressurized, non-slip, and non-removable; the other is to use a combination of fabric and sponge for a protective shoulder pad with seam wrapping on sides. However, this type of protective shoulder pad is not anti-slip and can easily cause damage to the neck skin when in contact. Therefore, a silicone shoulder pad is proposed to protect the neck from scratches, prevent slipping and reduce pressure on shoulders.

SUMMARY

The purpose of the present disclosure is to solve the technical problems proposed in the background technology.

The present disclosure adopts the following technical scheme: a silicone shoulder pad that can protect neck scratches, prevent slipping and reduce pressure on shoulders, including a shoulder pad body, where the shoulder pad body includes an upper pad portion and a lower pad portion that are correspondingly provided and connected; an installation channel is formed between the upper pad portion and the lower pad portion; the upper pad portion is provided with a wire groove connected to the installation channel, and the upper pad portion forms a first shoulder protection edge and a second shoulder protection edge through the wire groove; an outer surface of the lower pad portion is fixedly provided with a protruding structure, the installation channel is provided with a pressure reduction groove.

In an embodiment of the present disclosure, a connection portion between the upper pad portion and the lower pad portion is chamfered. Here, it helps to reduce scratches or discomfort to the skin when wearing, especially during larger movements. A rounded corner can reduce friction on the neck and shoulders. In addition, the rounded corner is more suitable for different shoulder curves, thereby increasing wearing comfort.

In an embodiment of the present disclosure, there are a plurality of protruding structures, and heights of the plurality of protruding structures are consistent; the plurality of protruding structures are distributed in a pile shape on two sides of the outer surface of the lower pad portion. Here, the friction between the silicone shoulder pad and the shoulder contact surface is increased, effectively preventing the silicone shoulder pad from sliding during use. At the same time, a presence of the protruding structure can disperse pressure, avoid shoulder compression caused by long-term wear, and provide a better pressure relief effect.

In an embodiment of the present disclosure, each protruding structure is a straight strip protrusion.

In an embodiment of the present disclosure, an anti-slip protrusion strip is provided in a middle of the outer surface of the lower pad portion.

In an embodiment of the present disclosure, the pressure reduction groove includes a plurality of honeycomb grooves, the plurality of honeycomb grooves are uniformly distributed in the installation channel. Here, the honeycomb structure, due to its unique geometric shape, can effectively disperse and absorb pressure, reduce a direct impact of gravity on the shoulders, facilitate ventilation and sweating, and improve wearing comfort and applicability.

In an embodiment of the present disclosure, the pressure reduction groove is provided in an inner surface of the lower pad portion.

In an embodiment of the present disclosure, the installation groove is located in a middle of the upper pad portion. Here, it helps to ensure the stability and balance of the shoulder pad when worn, so that the shoulder pad can better fit the shape of the shoulder and reduce the possibility of displacement and rotation.

Compared with existing technology, the advantages and effects of the present disclosure lie in:
the silicone shoulder pad of the present disclosure is provided with a wire groove connected to an installation channel at the upper pad portion, so that a shoulder strap (such as a seat belt, back strap, etc.) can be put into the installation channel or cylinder installation channel by flipping the first shoulder protection edge and second shoulder protection edge outward. This facilitates the disassembly, replacement, or cleaning of the silicone shoulder pad, and the design of the protruding structure can provide a better anti-slip effect. The pressure reduction groove can effectively cushion the shoulders and reduce discomfort when carrying the product. The present disclosure uses silicone material, which has environmental protection, soft and waterproof characteristics. Friction with the skin during use will not cause skin allergies, and it will not adsorb and produce moldy when sweating in summer.

Numeral reference: 100. silicone shoulder pad; 1. shoulder pad body; 101. upper pad portion; 102. lower pad portion; 103. connection portion; 11. first shoulder protection edge; 12. second shoulder protection edge; 2. protruding structure; 3. pressure reduction groove; 4. wire groove; 5. installation channel; 6. shoulder strap; 7. anti-slip protrusion strip.

DESCRIPTION OF EMBODIMENTS

In order to have a clearer understanding of the above objects, features, and advantages of the present disclosure, the following will further explain the present disclosure in combination with the accompanying drawings and embodiments. It should be noted that, without conflict, the embodiments of the present application and the features in the embodiments can be combined with each other.

Many specific details are elaborated in the following description to facilitate a thorough understanding of the present disclosure. However, the present disclosure can also be implemented in a different way than described herein. Therefore, the present disclosure is not limited to the specific embodiments disclosed in the following disclosure.

EMBODIMENT

Figure 1:
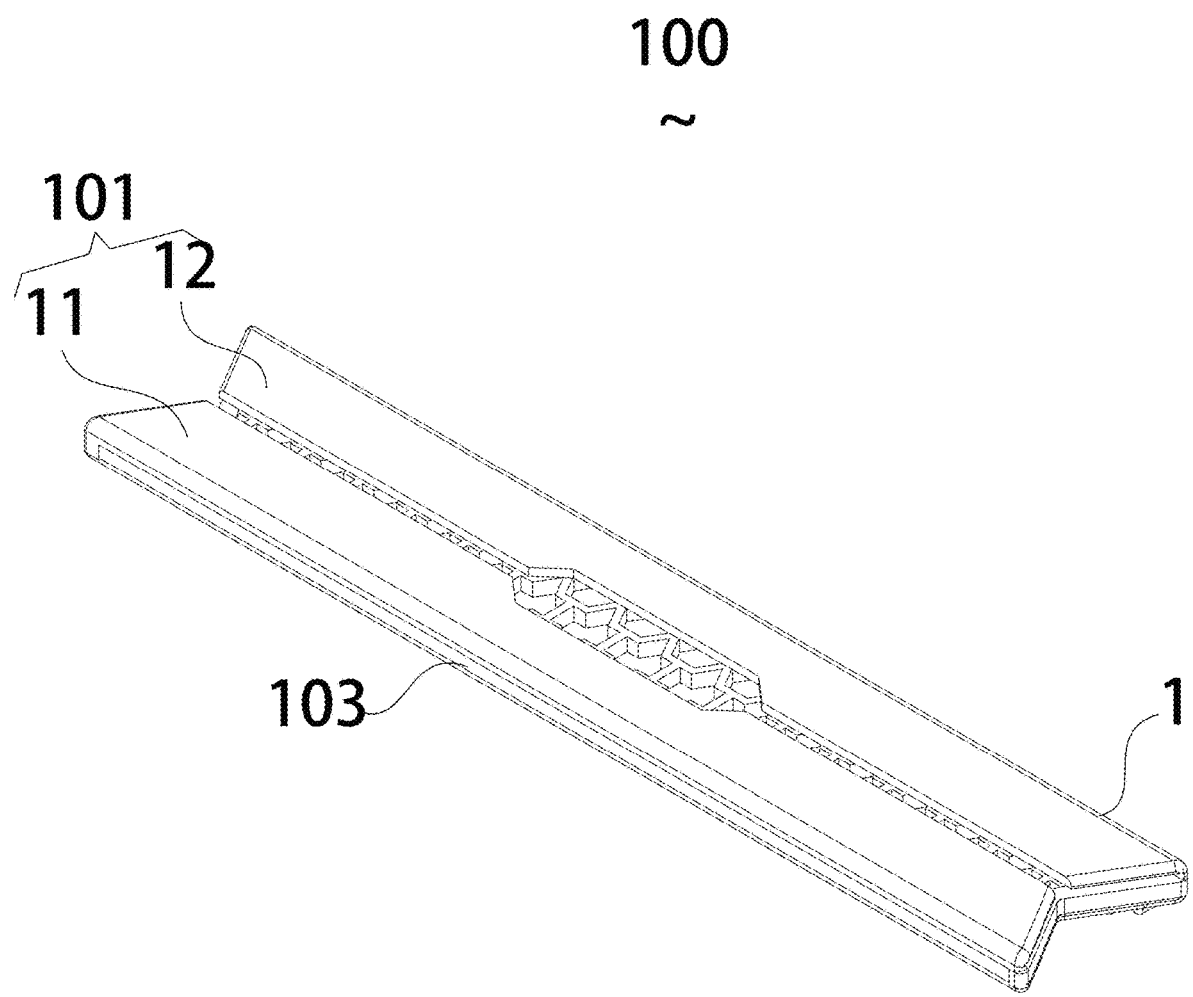
FIG. 1 is a schematic structural diagram of a silicone shoulder pad that can protect neck scratches, prevent slipping and reduce pressure on shoulders proposed by the present disclosure.
Figure 2:
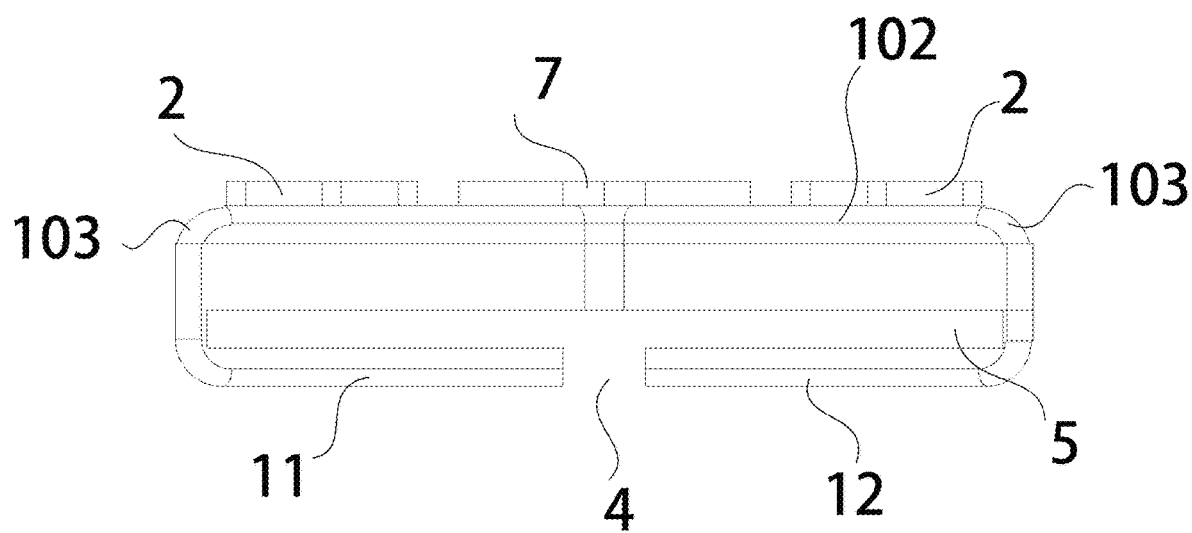
FIG. 2 is a side view of the silicone shoulder pad shown in FIG. 1.
Figure 3:
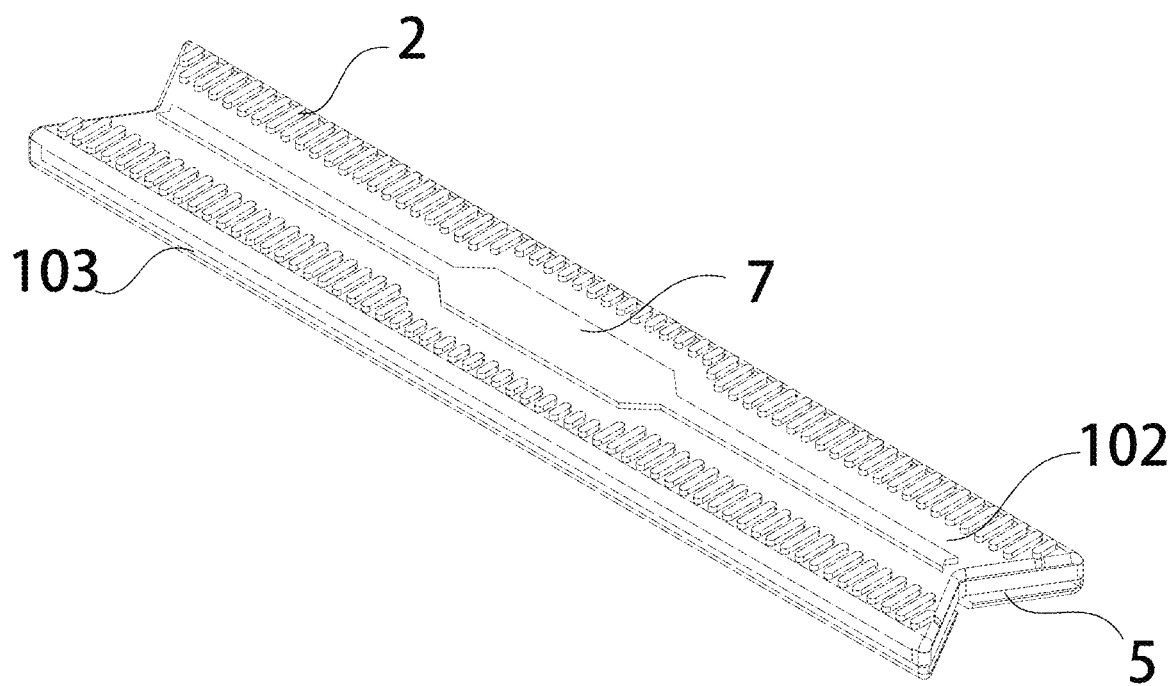
FIG. 3 is a bottom view of the silicone shoulder pad shown in FIG. 1.
Figure 4:
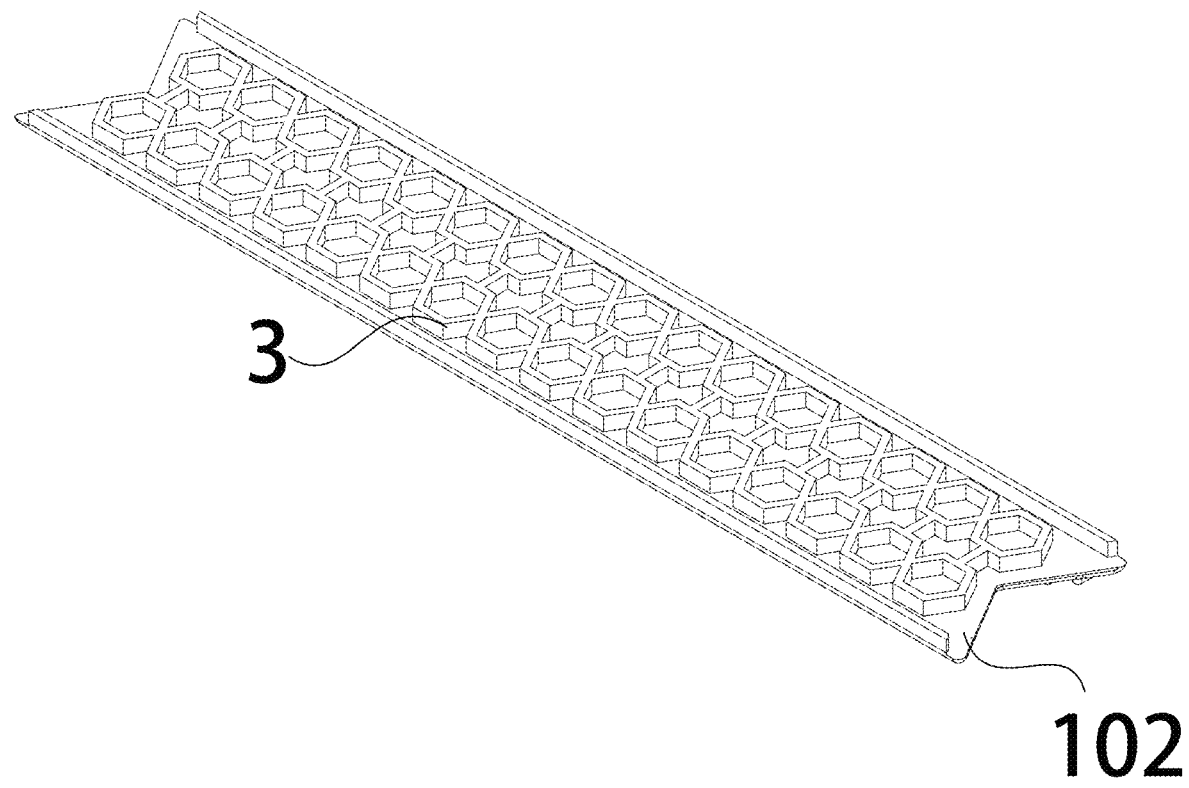
FIG. 4 is a schematic structural diagram of a lower pad portion and a pressure reduction groove of the silicone shoulder pad proposed in the present disclosure.
Figure 5:
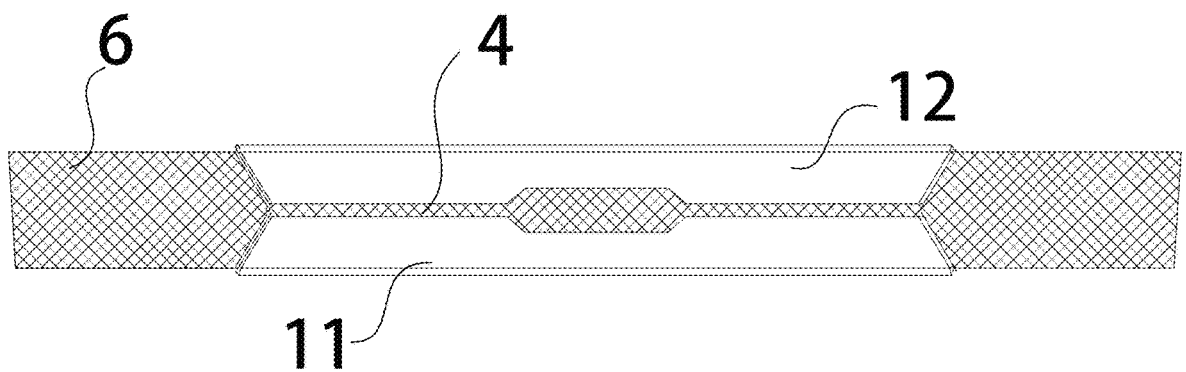
FIG. 5 is a schematic diagram of the silicone shoulder pad in combined with a shoulder strap provided by the present disclosure.

Please refer to FIGS. 1-5. The present disclosure provides a technical solution: a silicone shoulder pad 100 that can protect neck scratches, prevent slipping and reduce pressure on shoulders, including a shoulder pad body 1. An interior of the shoulder pad body 1 is hollow, and the shoulder pad body 1 includes an upper pad portion 101 and a lower pad portion 102 that are correspondingly provided and connected. An installation channel 5 is formed between the upper pad portion 101 and the lower pad portion 102, the installation channel 5 is also a hollow cavity inside the shoulder pad body 1. The upper pad portion 101 is provided with a wire groove 4 connected to the installation channel 5. The upper pad portion 101 forms a first shoulder protection edge 11 and a second shoulder protection edge 12 through the wire groove 4. The installation channel 5 is internally provided with a pressure reduction groove 3.

Working principle: due to the wire groove 4 is provided on the upper pad portion 101, thus, the upper pad portion 101 is divided into the first shoulder protection edge 11 and the second shoulder protection edge 12. Therefore, when using silicone shoulder pad, the first shoulder protection edge 11 and the second shoulder protection edge 12 can be flipped outward on two sides, and then a shoulder strap (such as a seat belt or a back strap) 6 can be inserted into the installation channel 5. After the first shoulder protection edge 11 and the second shoulder protection edge 12 lose an external force, they are reset, thereby limiting the shoulder strap 6 into the installation channel 5, and achieving an installation of the silicone shoulder pad 100. When it is necessary to remove the shoulder strap 6, the first shoulder protection edge 11 and the second shoulder protection d edge 12 are flipped outward to remove the shoulder strap 6. Therefore, through the above method, it is possible to disassemble and install the silicone shoulder pad 100, and it is easy to replace or clean the silicone shoulder pad 100. Where, when a user carries the silicone shoulder pad 100 on his shoulder, the upper pad portion 101 is located above and the lower pad portion 102 is located below, that is, the lower pad portion 102 is in contact with the shoulder. Through the protruding structure 2 on the lower pad portion 102, a friction force between the silicone shoulder pad 100 and the shoulder contact surface can be increased, effectively preventing the silicone shoulder pad 100 from sliding during use. In addition, by providing with the pressure reduction groove 3 in the installation channel 5, the shoulder can be effectively cushioned, and discomfort can be reduced. Besides, the silicone shoulder pad 100 is made of silicone material, which is environmentally friendly, soft and waterproof, and can prevent mold growth caused by absorbing sweat during summer sweating.

In an implementation, a connection portion 103 between the upper pad portion 101 and the lower pad portion 102 is a rounded corner, which can reduce scratching or discomfort to the skin when wearing, especially during larger movements. The rounded corners can reduce friction on the neck and shoulders. In addition, the rounded corners are more easily adapted to shoulder curves of different body types, thereby increasing wearing comfort.

In an implementation, there are a plurality of protruding structures 2, and heights of the plurality of protruding structures 2 remain consistent. The plurality of protruding structures 2 are distributed in a pile shape on two sides of the outer surface of the lower pad portion 102. Of course, in other embodiments, the plurality of protruding structures 2 can also be uniformly distributed on the outer surface of the lower pad portion 102. By providing with a plurality of high protruding structures 2 with same heights, shoulder strap pressure can be dispersed, thereby avoiding shoulder compression caused by prolonged wear, and providing a better pressure relief Where the protruding structure 2 can be a straight strip protrusion or a circular convex point, without any restrictions.

In an implementation, an anti-slip protrusion 7 is provided in a middle of the outer surface of the lower pad portion 102. A length of the anti-slip protrusion 7 extends along a length direction of the shoulder pad body 1, and its length is the same as that of the lower pad portion 102. This can further improve the anti-slip effect.

Where, there is a certain gap between the protruding structure 2 and the anti-slip protrusion strip 7, which can play a role in heat dissipation.

In an implementation, the pressure reduction groove 3 includes a plurality of honeycomb grooves, which are uniformly distributed in the installation channel 5. For example, the pressure reduction groove 3 can be provided on an inner surface of the lower pad portion 102, or the pressure reduction groove 3 can also be provided on an inner surface of the upper pad portion 101. By the honeycomb structure of the pressure reduction groove 3, the weight of the silicone shoulder pad 100 can be reduced while achieving the pressure reducing effect, and saving material cost. In addition, the honeycomb structure, due to its unique geometric shape, can effectively disperse and absorb pressure, reduce a direct impact of gravity on the shoulders, facilitate ventilation and sweating, and improve wearing comfort and applicability.

In an implementation, the wire groove 4 is provided in a middle of the upper pad portion 101, which helps to ensure the stability and balance of the silicone shoulder pad 100 when worn, allowing it to better fit the shape of the shoulder and reduce the possibility of displacement and rotation.

The above is only a preferred embodiment of the present disclosure and is not a limitation in any other form. Any skilled person in this field may use the disclosed technical content to modify or substitute equivalent embodiments for other fields. However, any simple modifications, equivalent changes, or modifications made to the above embodiments based on the technical essence of the present disclosure that do not deviate from the technical solution of the present disclosure still fall within the protection scope of the technical solution of the present disclosure.

What is claimed is:

1. A silicone shoulder pad that can protect neck scratches, prevent slipping and reduce pressure on shoulders, comprising a shoulder pad body, wherein the shoulder pad body comprises an upper pad portion and a lower pad portion that are correspondingly provided and connected; an installation channel is formed between the upper pad portion and the lower pad portion; the upper pad portion is provided with a wire groove connected to the installation channel, and the upper pad portion forms a first shoulder protection edge and a second shoulder protection edge through the wire groove; an outer surface of the lower pad portion is fixedly provided with a protruding structure, the installation channel is provided with a pressure reduction groove, wherein the pressure reduction groove comprises a plurality of honeycomb grooves, the plurality of honeycomb grooves are uniformly distributed in the installation channel.

2. The silicone shoulder pad according to claim 1, wherein a connection portion between the upper pad portion and the lower pad portion is chamfered.

3. The silicone shoulder pad according to claim 1, there are a plurality of protruding structures, and heights of the plurality of protruding structures are consistent; the plurality of protruding structures are distributed in a pile shape on two sides of the outer surface of the lower pad portion.

4. The silicone shoulder pad according to claim 3, where each protruding structure is a straight strip protrusion.

5. The silicone shoulder pad according to claim 3, wherein an anti-slip protrusion strip is provided in a middle of the outer surface of the lower pad portion.

6. The silicone shoulder pad according to claim 1, wherein the pressure reduction groove is provided in an inner surface of the lower pad portion.

7. The silicone shoulder pad according to claim 1, wherein the wire groove is located in a middle of the upper pad portion.

* * * * *